3,066,148
POLYCYANOSUBSTITUTED CYCLOBUTANES
Saul Winstein, Los Angeles, Calif., assignor to E. I. du Pont de Nemours and Company, Wilmington, Del., a corporation of Delaware
No Drawing. Filed Jan. 22, 1960, Ser. No. 4,003
12 Claims. (Cl. 260—313)

This invention is concerned with a new class of chemical compounds, and more particularly with polycyanocyclobutanes.

Blomquist and Meinwald, J. Am. Chem. Soc. 79, 5316 (1957) and Abstracts of Papers, 133rd Meeting of A.C.S., San Francisco, 77N (1958) describe the cycloaddition of tetracyanoethylene to the conjugated triene, 3,4-dimethylene-1,2-diphenylcyclobutene, and the conjugated diene, 1,2-diphenyl-4-methyl-3-methylenecyclobutene, to yield the 3-methylene and 3-methyl derivatives of 1,2-diphenyl-5,5,6,6-tetracyanospiro-[3.3]-1-heptene, respectively.

There has now been discovered a new class of polycyanocyclobutanes, viz., the 1,2,2-tricyanocyclobutanes and 1,1,2,2-tetracyanocyclobutanes, having at least one electron-donating group with its bond stemming from an oxygen, sulfur, or nitrogen atom and attached to one of the remaining cyclobutane ring carbon atoms. The invention also embraces the process for preparing these compounds by the reaction of tricyanoethylene or tetracyanoethylene with a monoolefin having attached to an olefinic carbon atom at least one electron-donating group with its bond stemming from an oxygen, sulfur, or nitrogen atom.

The process and products of this invention may be more particularly illustrated by the following equation:

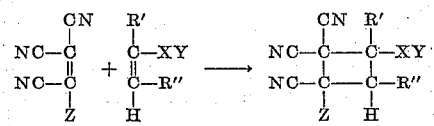

in which X is O, S, or NR; Y is hydrocarbyl, halohydrocarbyl, lower alkoxyhydrocarbyl, or, when X is NR, acyl (including sulfonyl); Z is H or CN; R, R', and R" are the same or different and taken separately represent hydrogen or hydrocarbyl and R' and R" taken together represent hydrocarbyl-substituted tetramethylene diradicals, with the proviso that when X is O or S, Y and R", taken together, can represent the trimethylene diradical; and that Y and R, taken together, can represent the 1-oxotetramethylene diradical or a hydrocarbon diradical with a 4-carbon chain which forms with the N or NR a 5-membered heterocyclic ring with aromatic character (i.e., pyrrolyl, indolyl, carbazolyl and the like). The reactants in the process of this invention are monoolefins, and thus all of the hydrocarbyl and substituted hydrocarbyl terms shown above are limited to those in which the hydrocarbyl moiety is free of aliphatic carbon-to-carbon unsaturation.

A distinguishing feature of this invention is the unpredictable ease with which the two particular classes of olefinic compounds, indicated above, react to form the product cyclobutanes. The reaction takes place readily at room temperature or below. Cooling is frequently desirable to dissipate the evolved heat, and good yields of product are obtained in a short time. This is in sharp contrast, for example, with the cycloaddition process of Barrick U.S. 2,462,345 where both heat and the presence of a polymerization inhibitor are required to insure the formation of a cyclobutane.

The reaction of this invention takes place simply on bringing the two unsaturated reactants into intimate contact at ordinary temperature. No additives or special conditions are essential. Because of the exothermic nature of the reaction, it is convenient to employ a diluent which is inert to the reactants and products to aid in dissipating the heat of reaction. The approach of the end of the reaction is readily observed by the reduction in the amount of heat given off.

Pressure is not a critical factor in this process. Pressures both above and below atmospheric pressure are operable, and atmospheric pressure is preferred for reasons of economy.

The proportion in which the two reactants are brought together is not limited in any way. For example, molar ratios ranging from 19:1 to 1:19 may be employed. However, the two reactants combine on an equimolar basis to form the cyclobutane product. Highest yields are, therefore, obtained when approximately equimolar quantities of the two reactants are employed.

Except for the limitation of being free from aliphatic carbon-to-carbon unsaturation, the term "hydrocarbyl," used in defining the products and process of this invention, means any monovalent organic radical composed solely of carbon and hydrogen. It is used in its full generic sense. The wide variation in the hydrocarbyl groups used in the illustrations which follow makes it evident that all hydrocarbyl groups free of aliphatic unsaturation are operable. Hydrocarbyl groups of this type may vary as to whether they are alkyl, cycloalkyl, aryl, aralkyl, alkaryl, single ring, multi ring, straight chain, branched chain, large, small, and the like. The widest variation of this sort does not in any way detract from the fundamental characteristic of the aliphatically saturated hydrocarbyl radical of passing unchanged through the process of this invention and exercising no effect whatever on the chemical steps of the process.

The limitations of space for disclosure are not to be construed as any limitation within the scope of "hydrocarbyl" contemplated in this invention. Even the most cumbersome saturated hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that saturated hydrocarbyl groups containing 20 or fewer carbon atoms are most available, and to that extent preferred. But there is to be no question of the operability of, or of the intent to include and disclose, any hydrocarbyl group whatsoever, as long as it is free of aliphatic carbon-to-carbon unsaturation. Except for factors of bulk and dilution, wide variations in size and structure of these hydrocarbyl radicals have no effect on the essential chemical nature of the cyclobutanes to which they are attached. All cyclobutanes of this invention obtainable by variation of hydrocarbyl groups within the above definitions are hereby disclosed. Discloseure of each and every possible hydrocarbyl embodiment is superfluous. The term "hydrocarbyl" is preferred over the synonomous term "hydrocarbon radical."

In the following examples, parts are by weight except as otherwise indicated. Example I represents a preferred embodiment.

EXAMPLE I

To a solution of 320 parts of tetracyanoethylene in 2220 parts of tetrahydrofuran cooled at 0° C. is added 216 parts of ethyl vinyl ether. The dark red-orange solution is kept cool for five minutes, at which time the deep color fades and most of the exothermic reaction is over. The mixture is allowed to stand at 25° C. for 67 hours, during which time it turns dark green. It is then diluted with about 3300 parts of petroleum ether. The solid that precipitates is collected by filtration to obtain 360 parts of 3-ethoxy-1,1,2,2-tetracyanocyclobutane.

The filtrate is evaporated to about one tenth its original volume and then diluted with about 990 parts of petroleum ether. An additional crop of 107 parts of dark green crystals of 3-ethoxy-1,1,2,2-tetracyanocyclobutane is obtained, making a total crude yield of 467 parts (93.4%). Two recrystallizations from 1,2-dichloroethane yield 412 parts of colorless 3-ethoxy-1,1,2,2-tetracyanocyclobutane, which, after two more recrystallizations, yields a pure product melting at 140–141° C. The infrared absorption spectrum shows bands at 4.45 microns (—CN), 6.90 and 7.27 microns (—CH$_3$), and 8.83 microns (C—O—C).

*Anal.*—Calcd. for C$_{10}$H$_9$N$_4$O: C, 59.69; H, 4.51; N, 27.85; M.W., 201.20. Found: C, 59.77; H, 4.04; N, 27.80; M.W., 201.

EXAMPLE II

To a stirred solution of 320 parts of tetracyanoethylene in 888 parts of tetrahydrofuran at 0° C. is added a solution of 230 parts of methyl vinyl ether in 444 parts of tetrahydrofuran. The orange reaction mixture is stirred and kept cool for five minutes, at which time a solid begins to precipitate. Cooling is discontinued, and the mixture is allowed to stand at 25° C. for one-half hour. The resulting light green solution containing suspended crystalline material is diluted with about 1650 parts of petroleum ether. The white solid which precipitates is collected by filtration, washed with ether, and dried to yield 430 parts (90% yield) of 3-methoxy-1,1,2,2-tetracyanocyclobutane. A sample of this product after two recrystallizations from 1,2-dichloroethane melts at 158–159.5° C. The infrared absorption spectrum shows bands at 4.45 microns (—CN), 6.88 microns (O—CH$_3$), and 8.80 microns (C—O—C).

*Anal.*—Calcd. for C$_9$H$_6$N$_4$O: C, 58.05; H, 3.25; N, 30.09; M.W., 186.17. Found: C, 58.11; H, 3.33; N, 29.96; M.W., 182.

EXAMPLE III

A solution of 384 parts of tetracyanoethylene in 1776 parts of tetrahydrofuran is cooled to 0° C. and 402 parts of benzyl vinyl ether is added. The reaction mixture turns bright orange and is kept cool for several minutes until the exothermic reaction subsides. Cooling is discontinued, and the mixture is allowed to stand at 25° C. for two hours. It is then diluted with two volumes of petroleum ether. The solid precipitate that forms is collected by filtration and washed with ether. Recrystallization of the crude product from a 1:1 mixture of 1,2-dichloroethane and ether, followed by thorough washing with ether, gives 650 parts (83% yield) of 3-benzyloxy-1,1,2,2-tetracyanocyclobutane, melting at 145–146.5° C. A sample recrystallized two more times from 1,2-dichloroethane melts at 148–150° C. The infrared absorption spectrum shows bands at 4.48 microns (—CN), 6.25 and 6.69 microns (benzene ring), 8.87 microns (C—O—C), and 13.34 microns (monosubstituted benzene).

*Anal.*—Calcd. for C$_{15}$H$_{10}$N$_4$O: C, 68.68; H, 3.84; N, 21.36. Found: C, 68.61; H, 3.84; N, 21.27

EXAMPLE IV

A mixture of 318 parts of β-chloroethyl vinyl ether, 384 parts of tetracyanoethylene, and 1776 parts of tetrahydrofuran is allowed to stand for two hours. The reaction mixture is evaporated to one-half its original volume by heating it above 80° C. and is then diluted with an equal volume of petroleum ether. The solid that separates is collected by filtration and washed with ether. The crude product is recrystallized by dissolving it in a minimum quantity of boiling 1,2-dichloroethane and diluting the hot solution with an equal volume of ether. The crystals that form are separated and washed with ether to yield 530 parts (77% yield) of 3-(β-chloroethoxy)-1,1,2,2-tetracyanocyclobutane, melting at 104.5–105.5° C. A sample recrystallized two more times from 1,2-dichloroethane melts at 105–106° C. The infrared absorption spectrum shows bands at 4.48 microns (—CN) and 8.72 microns (C—O—C).

*Anal.*—Calcd. for C$_{10}$H$_7$N$_4$ClO: C, 51.17; H, 3.01; N, 23.87. Found: C, 51.12; H, 3.11; N, 23.94.

EXAMPLE V

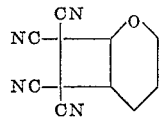

To a solution of 128 parts of tetracyanoethylene in 888 parts of tetrahydrofuran is added 185 parts of dihydropyran. The resulting deep red-brown solution warms spontaneously. After one-half hour, crystals begin to precipitate. The mixture is allowed to stand at 25° C. for 1.5 hours and is then diluted with 1070 parts of ether. The solid which precipitates is collected by filtration and washed with ether to yield 200 parts (94% yield) of 7,7,8,8-tetracyano-2-oxabicyclo[4.2.0]octane in the form of pale yellow cubes that decompose at 171° C. A sample recrystallized two times from acetonitrile melts at 173–176° C. with decomposition. The infrared absorption spectrum shows bands at 4.43 microns (—CN) and 8.82 microns (C—O—C).

*Anal.*—Calcd. for C$_{11}$H$_8$N$_4$O: C, 62.26; H, 3.80; N, 26.40; M.W., 212.20. Found: C, 62.54; H, 3.84; N, 26.39; M.W., 210.

EXAMPLE VI

A solution of 250 parts of tetracyanoethylene in 888 parts of tetrahydrofuran is cooled at 0° C. and 250 parts of 1-vinyl-2-pyrrolidone is added. Within ten minutes the original deep red-orange solution fades to yellow-green in color, and a solid precipitates. The mixture is diluted with about 990 parts of petroleum ether, and the precipitate is collected by filtration and washed with ether. The pale yellow product is dried under a reduced pressure of nitrogen at 30° C. for 20 minutes. This yields 430 parts (90% yield) of dark yellow N-(2,2,3,3-tetracyanocyclobutyl)-2-pyrrolidone melting with decomposition at 110–125° C. One hundred parts of the crude produce is dissolved in 391 parts of acetonitrile at room temperature, and the resulting solution is diluted with 535 parts of ether. The precipitate is recrystallized from 274 parts of acetonitrile and 535 parts of ether, recrystallized again from 118 parts of acetonitrile and 357 parts of ether, and again from 78 parts of acetonitrile and 178 parts of ether to yield crystalline N-(2,2,3,3-tetracyanocyclobutyl)-2-pyrrolidone, melting at 130–130.5° C. The infrared absorption spectrum shows bands at 4.43 microns (—CN) and 5.91 microns (δ-lactam).

*Anal.*—Calcd. for C$_{12}$H$_9$N$_5$O: C, 60.25; H, 3.79; N, 29.28; M.W., 239.23. Found: C, 60.50; H, 3.87; N, 29.49; M.W., 231.

EXAMPLE VII

To a solution of 260 parts of tetracyanoethylene in 888 parts of tetrahydrofuran is added 400 parts of N-vinyl-N-methylbenzenesulfonamide. The resulting orange-red solution warms slightly, and within two minutes the color fades to pale yellow-green and the mixture sets up into a paste. It is allowed to stand at 25° C. for one-half hour and is then diluted with about 330 parts of petroleum ether. The solid product is collected and washed with petroleum ether to yield 610 parts (94% yield) of light yellow 3-(N-methylbenzenesulfonamido)-1,1,2,2-tetracyanocyclobutane. A sample recrystallized three times from 1:4 acetonitrile:ether mixture melts at 130–145° C. with decomposition. The white, hairlike needles so obtained darken on standing. The infrared absorption spectrum shows bands at 4.43 microns (—CN), 6.90 microns (N—CH$_3$), 7.39 and 8.60 microns (—SO₂—), and 13.50 microns (monosubstituted benzene).

*Anal.*—Calcd. for $C_{15}H_{11}N_5SO_2$: C, 55.38; H, 3.41; M.W., 325. Found: C, 54.69; H, 3.30; M.W., 352.

EXAMPLE VIII

To a solution of 13 parts of tetracyanoethylene in 89 parts of tetrahydrofuran is added 21 parts of N-vinylcarbazole. The violet-colored solution becomes warm and, after two minutes, fades to pink in color. The solution is kept at 25° C. for two hours and then diluted with about 230 parts of petroleum ether. The solid that precipitates is collected by filtration and washed with ether to yield 330 parts of crude 3-(N-carbazolyl)-1,1,2,2-tetracyanocyclobutane, melting with decomposition at 70–80° C.

EXAMPLE IX

To a solution of 128 parts of tetracyanoethylene in 444 parts of tetrahydrofuran is added 150 parts of benzyl vinyl sulfide in 222 parts of tetrahydrofuran. After one hour, the original brown-orange color of the solution has faded to a light orange color. The mixture is diluted by adding about 2310 parts of petroleum ether. 3-benzylthio-1,1,2,2-tetracyanocyclobutane crystallizes as cubes weighing 157 parts and melting at 119.5–121° C. A second crop of 75 parts is obtained when the mother liquor is diluted with about 2970 parts of petroleum ether. 3-benzylthio-1,1,2,2-tetracyanocyclobutane crystallizes either as cubes melting at 119–121° C., as above, or as needles melting at 123–124.5° C. These two forms show identical infrared absorption spectra and can be interconverted by appropriate seeding during recrystallization. Recrystallization from 1,2 - dichloroethane/cyclohexane mixture yields cubes melting at 119.5–121° C. The infrared absorption spectrum shows bands at 4.46 microns (—CN), at 6.25 and 6.70 microns (Ar), and at 13.42 and 14.20 microns (monosubstituted benzene).

*Anal.*—Calcd. for $C_{15}H_{10}N_4S$: C, 64.73; H, 3.62; N, 20.13. Found: C, 65.04; H, 3.18; N, 20.43.

EXAMPLE X

To a solution of 200 parts of tricyanoethylene in 143 parts of ether, 261 parts of benzyl vinyl ether in 214 parts of ether is added under a nitrogen atmosphere. After four hours, the resulting precipitate is separated and washed with a small amount of cold ether. The tan crystalline material, M.P. 100–108° C., weighs 342 parts (74% yield). Recrystallizations from ether (only slowly soluble) give 3-benzyloxy-1,2,2-tricyanocyclobutane in the form of white needles, M.P. 115–116° C. The ultra-violet absorption spectrum in ethanol shows only the low intensity fine-structure bands characteristic of benzenoid absorption.

*Anal.*—Calcd. for $C_{14}H_{11}N_3O$: C, 70.9; H, 4.7; N, 17.7; M.W., 237. Found: C, 70.6; H, 4.7; N, 17.7; M.W., 229.

EXAMPLE XI

To a solution of 26 parts of tetracyanoethylene in 89 parts of tetrahydrofuran is added 16 parts of N-methyl-N-vinylformamide. The solution turns red and warms spontaneously. After five minutes the solution has faded to a yellow color and a crystalline precipitate begins to form in the still warm solution. After 15 minutes the crystalline precipitate is collected by filtration, washed with diethyl ether, and dried to obtain about 33 parts of 3 - (N-methylformamido) - 1,1,2,2-tetracyanocyclobutane which melts, with decomposition, at 135–139° C. The infrared absorption spectrum of this product shows bands at 4.5 microns (—CN) and at 6.05 microns (carbonyl). The nuclear magnetic resonance spectrum is consistent with the indicated structure.

EXAMPLE XII

To a solution of 13 parts of tetracyanoethylene in 44 parts of tetrahydrofuran is added 10 parts of N-methyl-N-vinylacetamide. At the point of mixture the solution is dark red-amber in color. The color fades quickly. The solution boils spontaneously from the exothermic reaction and a crystalline precipitate forms. The solution is cooled briefly to 0° C. and let stand for 15 minutes at 25° C. It is then diluted with about 40 parts of petroleum ether. The crystalline precipitate is collected by filtration and washed with diethyl ether to yield 23 parts of 3 - (N - methylacetamido) - 1,1,2,2 - tetracyanocyclobutane. This is recrystallized from methyl ethyl ketone/ether to give colorless needles melting with decomposition, at 132–133° C.

When the following unsaturated compounds are substituted for ethyl vinyl ether in the process of Example I, the indicated 1,1,2,2-tetracyanocyclobutane products are obtained.

*Table*

| Unsaturated Compound Substituted for Ethyl Vinyl Ether in Example I | 1,1,2,2-Tetracyanocyclobutane Product |
|---|---|
| isopropyl vinyl ether | 3 - isopropoxy - 1,1,2,2 - tetracyanocyclobutane. |
| n-butyl vinyl ether | 3 - butoxy - 1,1,2,2 - tetracyanocyclobutane. |
| 2-ethylhexyl vinyl ether | 3 - (2 - ethylhexyloxy) - 1,1,2,2 - tetracyanocyclobutane. |
| 2-methoxyethyl vinyl ether | 3 - (2 - methoxyethoxy) - 1,1,2,2 - tetracyanocyclobutane. |
| 2-ethoxyethyl vinyl ether | 3 - (2 - ethoxyethoxy) - 1,1,2,2 - tetracyanocyclobutane. |
| octyl vinyl ether | 3 - octyloxy - 1,1,2,2 - tetracyanocyclobutane. |
| octadecyl vinyl ether | 3 - octadecyloxy - 1,1,2,2 - tetracyanocyclobutane. |
| phenyl vinyl ether | 3 - phenoxy - 1,1,2,2 - tetracyanocyclobutane. |
| methyl α-methylvinyl ether | 3 - methoxy - 3 - methyl - 1,1,2,2 - tetracyanocyclobutane. |
| ethyl α-ethylvinyl ether | 3 - ethoxy - 3 - ethyl - 1,1,2,2 - tetracyanocyclobutane. |
| ethyl α-phenylvinyl ether | 3 - ethoxy - 3 - phenyl - 1,1,2,2 - tetracyanocyclobutane. |
| cyclohexyl vinyl ether | 3 - cyclohexyloxy - 1,1,2,2 - tetracyanocyclobutane. |
| β-phenylpropyl vinyl ether | 3 - (β - phenylpropoxy) - 1,1,2,2 - tetracyanocyclobutane. |
| β - decahydronaphthyl vinyl ether. | 3 - (β - decahydronaphthyloxy) - 1,1,2,2-tetracyanocyclobutane. |
| α-naphthyl vinyl ether | 3 - (α - naphthyloxy) - 1,1,2,2 - tetracyanocyclobutane. |
| 2,4,6 - trichlorophenyl vinyl ether. | 3 - (2,4,6 - trichlorophenoxy) - 1,1,2,2-tetracyanocyclobutane. |
| methyl vinyl sulfide | 3 - methylthio - 1,1,2,2 - tetracyanocyclobutane. |
| 1,2-dichloroethyl vinyl sulfide | 3 - (1,2 - dichloroethylthio) - 1,1,2,2-tetracyanocyclobutane. |
| 2-ethoxyethyl vinyl sulfide | 3 - (2 - ethoxyethylthio) - 1,1,2,2 - tetracyanocyclobutane. |
| octadecyl vinyl sulfide | 3 - octadecylthio - 1,1,2,2 - tetracyanocyclobutane. |
| phenyl vinyl sulfide | 3 - phenylthio - 1,1,2,2 - tetracyanocyclobutane. |
| 2,5 - dimethyl - 4 - chlorophenyl vinyl sulfide. | 3 - (2,4 - dimethyl - 4 - chlorophenylthio) - 1,1,2,2 - tetracyanocyclobutane. |
| β-naphthyl vinyl sulfide | 3 - (β - naphthylthio) - 1,1,2,2 - tetracyanocyclobutane. |
| dihydrothiapyran | 7,7,8,8 - tetracyano - 2 - thiabicyclo [4.2.0]octane. |
| dimethyl-N-vinylamine | 3 - (N,N - dimethylamino) - 1,1,2,2-tetracyanocyclobutane. |
| diphenyl-N-vinylamine | 3 - (N,N - diphenylamino) - 1,1,2,2-tetracyanocyclobutane. |
| N-vinylpyrrole | 3 - (N - pyrrolyl) - 1,1,2,2 - tetracyanocyclobutane. |
| N-vinylindole | 3 - (N - indolyl) - 1,1,2,2 - tetracyanocyclobutane. |
| N-phenyl-N-vinylacetamide | 3 - (N - phenylacetamido) - 1,1,2,2-tetracyanocyclobutane. |
| 2-methoxy-2-butene | 3,4 - dimethyl - 3 - methoxy - 1,1,2,2-tetracyanocyclobutane. |
| 3-methoxy-3-hexene | 3,4 - diethyl - 3 - methoxy - 1,1,2,2-tetracyanocyclobutane. |
| α-methoxystyrene | 3 - methoxy - 3 - phenyl - 1,1,2,2 - tetracyanocyclobutane. |
| β-methoxystyrene | 3 - methoxy - 4 - phenyl - 1,1,2,2 - tetracyanocyclobutane. |
| cholestane-3-one enol ethyl ether. | 1 - (1,5 - dimethylhexyl) - 6a - ethoxy-9a,11a - dimethylperhydrocyclobuta [h] cyclopenta [a] phenanthrene-7,7,8,8-tetracarbonitrile. |

When the unsaturated compounds shown in the table above are substituted for benzyl vinyl ether in the procedure of Example X, the corresponding 1,2,2-tricyanocyclobutanes are obtained. Thus, methyl vinyl sulfide yields 3-methylthio-1,2,2-tricyanocyclobutane; diphenyl-N-vinyl amine yields 3-(N,N-diphenylamino)-1,2,2-tricyanocyclobutane; N-vinylindole yields 3-(N-indolyl)-1,2,2 - tricyanocyclobutane; N - phenyl - N - vinylacetamide yields 3-(N-phenylacetamido)-1,2,2-tricyanocyclobutane; etc.

The 1,2,2-tricyanocyclobutanes and 1,1,2,2-tetracyanocyclobutanes of this invention are all useful as sources of hydrogen cyanide for fumigation and insect extermination purpose. This may be illustrated as follows:

A fumigation generator is charged with 5 parts of 3-ethoxy-1,1,2,2-tetracyanocyclobutane and 100 parts of water. Heat is applied to boil the water and copious fumes of hydrogen cyanide are given off. The presence of hydrogen cyanide in the fumes is confirmed by chemical test. Even after the generator has cooled to room temperature, insects (*Popillia japonica*) exposed to the vapors from the generator are killed within less than three minutes.

Similar results are obtained when 3-benzyloxy-1,1,2,2-tetracyanocyclobutane is substituted for 3-ethoxy-1,1,2,2-tetracyanocyclobutane in the fumigation procedure described above. The corresponding 1,2,2-tricyanocyclobutanes are likewise effective in this use.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula:

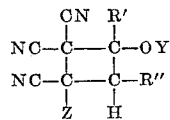

wherein Z is selected from the group consisting of hydrogen and
cyano;

R' and R" are of up to and including 20 carbon atoms, free of aliphatic carbon-to-carbon unsaturation and selected from the group consisting of hydrogen and
hydrocarbyl, when taken separately, and
hydrocarbylsubstituted tetramethylene, when taken together, and;

Y is of up to and including 20 carbon atoms, free of aliphatic carbon-to-carbon unsaturation and selected from the group consisting of hydrocarbyl,
halohydrocarbyl,
lower alkoxyhydrocarbyl, and when taken together with R", trimethylene.

2. A compound of the formula:

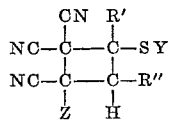

wherein Z is selected from the group consisting of hydrogen and
cyano;

R' and R" are of up to and including 20 carbon atoms, free of aliphatic carbon-to-carbon unsaturation and selected from the group consisting of hydrogen and
hydrocarbyl, when taken separately, and
hydrocarbylsubstituted tetramethylene, when taken together, and;

Y is of up to and including 20 carbon atoms, free of aliphatic carbon-to-carbon unsaturation and selected from the group consisting of hydrocarbyl,
halohydrocarbyl,
lower alkoxyhydrocarbyl, and when taken together with R", trimethylene.

3. A compound of the formula:

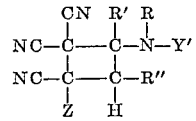

wherein Z is selected from the group consisting of hydrogen and
cyano;

R' and R" are of up to and including 20 carbon atoms, free of aliphatic carbon-to-carbon unsaturation and selected from the group consisting of hydrogen and
hydrocarbyl, when taken separately, and
hydrocarbylsubstituted tetramethylene, when taken together;

R is of up to and including 20 carbon atoms, free of aliphatic carbon-to-carbon unsaturation and is selected from the group consisting of hydrogen and
hydrocarbyl; and Y' is of up to and including 20 carbon atoms, free of aliphatic carbon-to-carbon unsaturation and selected from the group consisting of hydrocarbyl,
halohydrocarbyl,
lower alkoxyhydrocarbyl,
acyl,
and, when taken together with R, Y' is selected from the group consisting of 1-oxotetramethylene and a 4-carbon chain hydrocarbon which forms, with the nitrogen to which said R group is attached, a pyrrole ring.

4. 3-ethoxy-1,1,2,2-tetracyanocyclobutene.
5. 3-methoxy-1,1,2,2-tetracyanocyclobutane.
6. 3-benzyloxy-1,1,2,2-tetracyanocyclobutane.
7. 7,7,8,8-tetracyano-2-oxabicyclo-[4.2.0]-octane.
8. N-(2,2,3,3,tetracyanocyclobutyl)-2-pyrrolidine.
9. 3-benzylthio-1,1,2,2-tetracyanocyclobutane.
10. Process which comprises reacting at a temperature in the range of 0–100° C. a polycyanoethylene of the formula

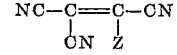

wherein Z is selected from the group consisting of hydrogen and
cyano, with a monoolefin of the formula

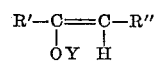

wherein R' and R" are of up to and including 20 carbon atoms, free of aliphatic carbon-to-carbon unsaturation and selected from the group consisting of hydrogen and
hydrocarbyl, when taken separately, and hydrocarbyl-substituted tetramethylene, when taken together; and, Y is of up to and including 20 carbon atoms, free of aliphatic carbon-to-carbon unsaturation and selected from the group consisting of hydrocarbyl,
halohydrocarbyl,
lower alkoxyhydrocarbyl, and when taken together with R'', trimethylene.

11. Process which comprises reacting at a temperature in the range of 0–100° C. a polycyanoethylene of the formula $$\begin{array}{c} NC-C=C-CN \\ | \quad | \\ CN \quad Z \end{array}$$

wherein Z is selected from the group consisting of hydrogen and
cyano, with a monoolefin of the formula $$\begin{array}{c} R'-C=C-R'' \\ | \quad | \\ SY \quad H \end{array}$$

wherein R' and R'' are of up to and including 20 carbon atoms, free of aliphatic carbon-to-carbon unsaturation and selected from the group consisting of hydrogen and
hydrocarbyl, when taken separately, and
hydrocarbyl-substituted tetramethylene, when taken together; and;

Y is of up to and including 20 carbon atoms, free of aliphatic carbon-to-carbon unsaturation and selected from the group consisting of hydrocarbyl,
halohydrocarbyl,
lower alkoxyhydrocarbyl, and when taken together with R'', trimethylene.

12. Process which comprises reacting at a temperature in the range of 0°–100° C. polycyanoethylene of the formula $$\begin{array}{c} NC-C=C-CN \\ | \quad | \\ CN \quad Z \end{array}$$

wherein Z is selected from the group consisting of hydrogen and
cyano, with a monoolefin of the formula $$\begin{array}{c} R'-C=C-R'' \\ | \quad | \\ R-N \quad H \\ | \\ Y' \end{array}$$

wherein R' and R'' are of up to and including 20 carbon atoms, free of aliphatic carbon-to-carbon unsaturation and selected from the group consisting of hydrogen, and
hydrocarbyl, when taken separately, and
hydrocarbyl-substituted tetramethylene, when taken together;

R is of up to and including 20 carbon atoms, free of aliphatic carbon-to-carbon unsaturation and is selected from the group consisting of hydrogen and
hydrocarbyl; and Y' is of up to and including 20 carbon atoms, free of aliphatic carbon-to-carbon unsaturation and selected from the group consisting of hydrocarbyl,
halohydrocarbyl,
lower alkoxyhydrocarbyl,
acyl,
and when taken together with R, Y' is selected from the group consisting of 1-oxotetramethylene and a 4-carbon chain hydrocarbon which forms, with the nitrogen to which said R group is attached, a pyrrole ring.

No references cited.

UNITED STATES PATENT OFFICE
CERTIFICATE OF CORRECTION

Patent No. 3,066,148                         November 27, 1962

Saul Winstein

It is hereby certified that error appears in the above numbered patent requiring correction and that the said Letters Patent should read as corrected below.

Column 8, line 54, for "tetracyanocyclobutene" read -- tetracyanocyclobutane --.

Signed and sealed this 14th day of May 1963.

(SEAL)
Attest:

ERNEST W. SWIDER
Attesting Officer

DAVID L. LADD
Commissioner of Patents